United States Patent
Friede et al.

(10) Patent No.: US 10,197,161 B2
(45) Date of Patent: Feb. 5, 2019

(54) MACHINING PROCESS FOR TRAPEZOID RINGS WITH SMALL AXIAL DIMENSIONS, USED IN PISTONS OF INTERNAL COMBUSTION ENGINES

(71) Applicant: KS KOLBENSCHMIDT GMBH, Neckarsulm (DE)

(72) Inventors: Reiner Friede, Neckarsulm (DE); Denis Beller, Leingarten (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 14/782,109

(22) PCT Filed: Feb. 28, 2014

(86) PCT No.: PCT/EP2014/053918
§ 371 (c)(1),
(2) Date: Oct. 2, 2015

(87) PCT Pub. No.: WO2014/161696
PCT Pub. Date: Oct. 9, 2014

(65) Prior Publication Data
US 2016/0025219 A1    Jan. 28, 2016

(30) Foreign Application Priority Data

Apr. 3, 2013  (DE) .......................... 10 2013 205 879
Oct. 22, 2013  (DE) .......................... 10 2013 221 395

(51) Int. Cl.
*F16J 9/20*    (2006.01)
*F02F 3/00*    (2006.01)
(Continued)

(52) U.S. Cl.
CPC .................. *F16J 9/20* (2013.01); *B23B 1/00* (2013.01); *B23B 27/06* (2013.01); *F02F 3/00* (2013.01);
(Continued)

(58) Field of Classification Search
CPC . F16J 9/00; F16J 9/20; F16J 9/22; F02F 3/00
(Continued)

(56) References Cited

U.S. PATENT DOCUMENTS 2,963,329 A * 12/1960 Scherenberg .............. F16J 1/02
                                                                92/208
3,759,148 A *  9/1973 Geffroy ..................... F02F 3/00
                                                                277/451
(Continued)

FOREIGN PATENT DOCUMENTS

DE    102009040084 A1    3/2011
DE    112011100377       12/2012
(Continued)

*Primary Examiner* — Long T Tran
(74) *Attorney, Agent, or Firm* — Young Basile Hanlon & MacFarlane, P.C.

(57) ABSTRACT

A method for producing a piston for internal combustion engines, where the piston includes a circumferential trapezoid annular groove for receiving trapezoid rings with small axial dimensions the groove having a groove base with adjoining surfaces and groove flanks. The groove base with adjoining surfaces is created in a first method step by machining using a cutting steel tool and the groove flanks are created in a further method step. Also disclosed are a piston produced according to the method and a cutting steel tool.

3 Claims, 3 Drawing Sheets

(51) Int. Cl.
*B23B 27/06* (2006.01)
*F16J 9/00* (2006.01)
*F16J 9/22* (2006.01)
*B23B 1/00* (2006.01)

(52) U.S. Cl.
CPC ............... *F16J 9/00* (2013.01); *F16J 9/203* (2013.01); *F16J 9/22* (2013.01); *B23B 2200/0485* (2013.01); *B23B 2215/245* (2013.01); *B23B 2215/247* (2013.01); *B23B 2220/12* (2013.01)

(58) Field of Classification Search
USPC .............................................. 123/19.1, 193.6
See application file for complete search history.

(56) References Cited

U.S. PATENT DOCUMENTS

| | | | | |
|---|---|---|---|---|
| 3,843,138 | A * | 10/1974 | Cobb | F16J 9/00 123/193.6 |
| 5,295,696 | A * | 3/1994 | Harayama | F16J 9/062 277/443 |
| 5,598,763 | A * | 2/1997 | Rao | F16J 1/08 277/442 |
| 6,454,271 | B2 * | 9/2002 | Ishida | F16J 9/063 277/434 |
| 7,815,195 | B2 * | 10/2010 | Meller | F16J 9/08 277/447 |
| 9,027,462 | B2 * | 5/2015 | Mordukhovich | F16J 9/06 92/158 |
| 2004/0170481 | A1 | 9/2004 | Gati | |
| 2013/0031782 | A1 * | 2/2013 | Rall | B23B 5/00 29/888.049 |

FOREIGN PATENT DOCUMENTS

| | | |
|---|---|---|
| EP | 2407265 A1 | 1/2012 |
| JP | S5151580 | 4/1976 |
| JP | S55147210 | 10/1980 |
| JP | S63154120 | 10/1988 |
| JP | H0266903 | 5/1990 |
| JP | H10202406 A | 8/1998 |
| JP | 2007105844 A | 4/2007 |

* cited by examiner

MACHINING PROCESS FOR TRAPEZOID RINGS WITH SMALL AXIAL DIMENSIONS, USED IN PISTONS OF INTERNAL COMBUSTION ENGINES

BACKGROUND

The disclosure relates to a trapezoid ring, the production of a groove for the trapezoid ring in the piston, and an assembly, including a piston having a trapezoid ring of this kind.

Trapezoid rings for pistons, which are inserted into corresponding grooves in the ring zone of the piston, are known, e.g. from EP 0 398 993 B1 (DE 689 19 074 T2), DE 41 19 908 A1, DE 11 2011 100 377 T5, DE 10 2007 057 840 A1, DE 196 16 474 A1, and DE 30 345 19 C2 or DE 944 761. However, the trapezoid annular grooves disclosed in the abovementioned documents are not suitable for receiving trapezoid rings having a small axial overall height, and this leads to a relatively large extent of the piston in a direction parallel to the piston stroke axis.

DE 43 41 386 C2 discloses a seal unit for pistons of internal combustion engines having an annular groove arranged in the fire land of the piston, the annular groove having an upper groove flank of conical design for receiving a piston ring designed with a corresponding flank. Here, the piston ring rests on the upper region of the piston, that facing the combustion chamber, leading to increased wear of the piston ring.

Owing to the overall height hitherto used for trapezoid rings, it is problematic, especially under series production conditions, to produce a trapezoid groove which decreases in axial height from the outside in the direction of the piston stroke axis. On the other hand, however, there is the requirement for a small height of trapezoid rings in order in that way to reduce the piston height.

SUMMARY

According to the disclosure, therefore, a trapezoid ring is provided which has a trapezoid cross section and, at the same time, has a reduced overall height relative to known trapezoid rings. The maximum height of the trapezoid ring in the inward direction of the piston stroke axis is preferably less than or equal to 1 mm. It has hitherto been impossible to achieve such dimensions in series production operations for trapezoid annular grooves since the tool steels required for this purpose do not allow an internal dimension with a maximum height of 1 mm for machining to obtain the annular groove. Therefore, provision is furthermore made for the trapezoid annular groove to be produced in two steps. First of all, use is made of a tool steel which has a trapezoid profile as viewed from the outside inward in the direction of the piston stroke axis, and which has two mutually parallel flanks or surfaces at the inward-facing end. With a tool steel of this kind, the groove is plunge cut in advance and the groove flanks are then finish-machined in a second step, allowing the correspondingly designed trapezoid ring with a small overall height to be inserted into the groove. Finally, after this procedure, the finished piston having a trapezoid annular groove of small height is available, into which a trapezoid ring with a correspondingly small overall height is inserted and a piston of this kind can be installed in the cylinder of an internal combustion engine.

In a method for producing a piston for internal combustion engines, the piston includes a circumferential trapezoid annular groove for receiving trapezoid rings with small axial dimensions, the groove having a groove base with adjoining surfaces and groove flanks. According to the disclosure the groove base with the adjoining surfaces is created in a first method step by machining using a tool steel and the groove flanks are created in a further method step. By dividing the production of a trapezoid groove into two method steps, it is possible to create a groove base with a small overall height.

It is furthermore envisaged that the machining of the annular groove is performed in such a way that the flank surfaces adjoining the groove base extend parallel or almost parallel to one another. The tool life can thereby be significantly increased, and the reception of the trapezoid ring as far as the groove base is thus ensured.

The aim is also that machining of the annular groove should be performed in such a way that the groove flanks are oriented trapezoidally relative to one another. The reception of the trapezoid ring as far as the groove base is facilitated by the funnel-shaped or trapezoid arrangement of the groove flanks.

It is furthermore envisaged that a transitional region between the surfaces and the groove flanks is formed by the machining of the annular groove. The groove base enables the trapezoid ring to be received and fixed on its side facing the piston stroke axis.

The method is performed in such a way that the groove base has an overall height of less than 2 mm, preferably less than 1.5 mm, in particular less than 1 mm, after machining. The trapezoid annular groove can thus receive trapezoid rings with a small axial extent. As a result, it is, in turn, possible to achieve a small overall height of the piston.

The tool steel for performing a method is designed in such a way that the tool steel has parallel or almost parallel surfaces at its end forming the subsequent groove base. It is thereby possible to achieve a small overall height in the region of the groove base in combination with long tool life and low wear as a result.

The tool steel is designed in such a way that trapezoid groove flank surfaces which are oriented outward from the piston stroke axis adjoin the almost parallel flank surfaces. The advantage is that the future position of the groove flanks relative to one another is formed in the first method step. In a subsequent method step, all that is required is to machine the exact dimensions of the trapezoid groove surfaces relative to one another.

DETAILED DESCRIPTION OF THE DRAWING

The present method is explained further by means of the figures described below.

DETAILED DESCRIPTION

Figure 1:
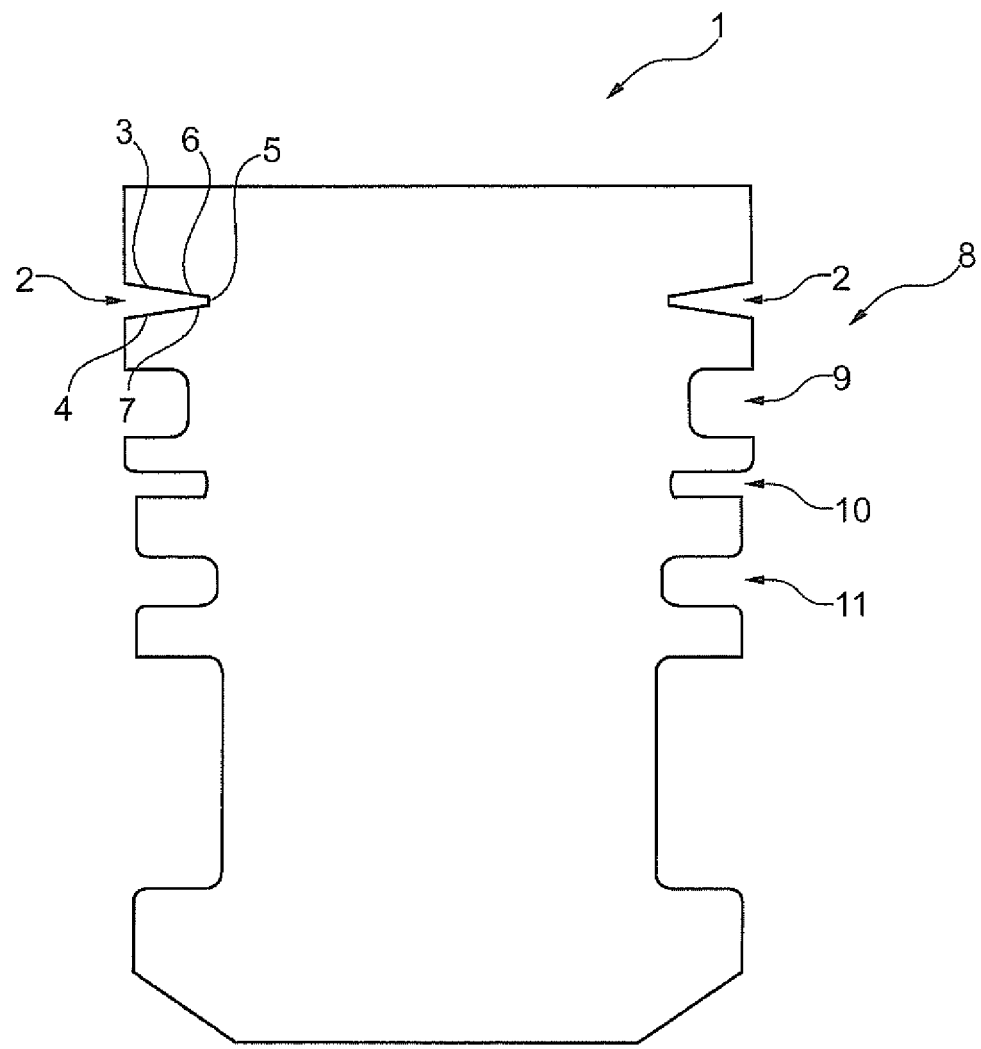
FIG. 1 shows a schematic illustration of a piston.
Figure 2:
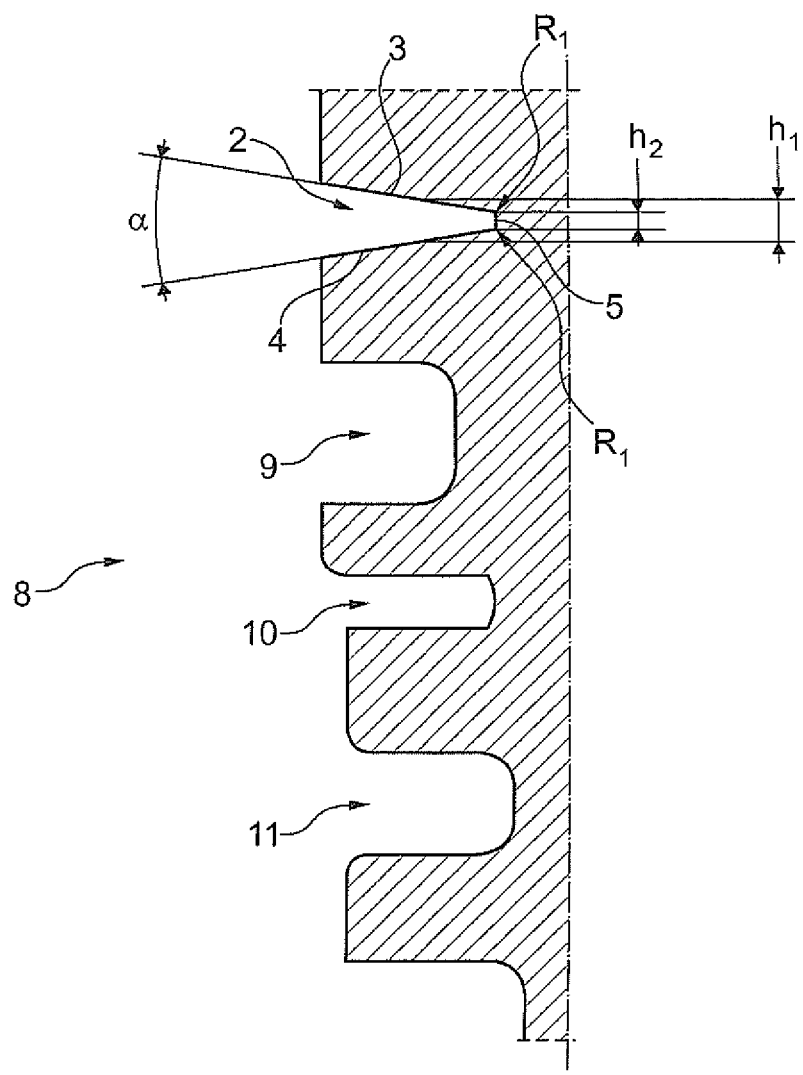
FIG. 2 shows a detail of a ring zone having a trapezoid groove corresponding to a current state.
Figure 3:
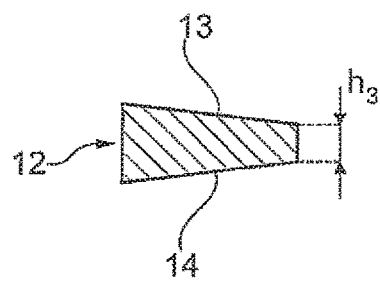
FIG. 3 shows a schematic sectional view of a tool steel corresponding to a current state.

FIGS. 2 and 3 show the current state and FIGS. 1, 4, 5 and 6 show the solution according to the present method.

The same reference signs are used for the same elements in both illustrative embodiments.

In the following description of FIGS. 1-6, terms such as top, bottom, left, right, front, rear etc. relate exclusively to the illustrative depiction and position of the device and of other elements chosen in the respective Figures. These terms are not to be taken as restrictive, that is to say, these terms can change owing to differences in position and/or mirror-symmetrical design or the like.

FIG. 1 shows a schematic view of a piston 1 having a trapezoid, radially encircling annular groove 2, which has groove flanks 3, 4 and a groove base 5. Arranged adjacent to the groove base 5 are flanks 6, 7, which are oriented almost parallel to one another. Annular groove 2 is part of a ring zone 8, which has further annular grooves 9, 10 and 11 of different design.

In FIG. 2, it can be seen that the minimum overall height $h_1$ of annular groove 2 is 1.96 mm in this example. The ideal case shown there, that the trapezoid groove narrows further toward the inside, e.g. to an overall height $h_2$ of 0.17 mm, cannot be achieved in practice since wear occurs with tool steels 12 having an overall height $h_3$ less than or equal to 1 mm. This wear is caused by the complete trapezoid profile of the surfaces 13, 14 from the outside inward in the direction of the piston stroke axis (when FIG. 3 showing the tool steel 12 is viewed from left to right). This means that, with this design, the tool steel 12 shown there and the production method, it is not possible for trapezoid rings with a small height and annular grooves 2 which are of trapezoid design to be used with the desired small overall height. A radius $R_1$ of 0.3 is provided for the transition from the groove base 5 to the flanks 6, 7, for example. The opening angle α provided is 15 degrees and 12 minutes, for example.

Figure 4:
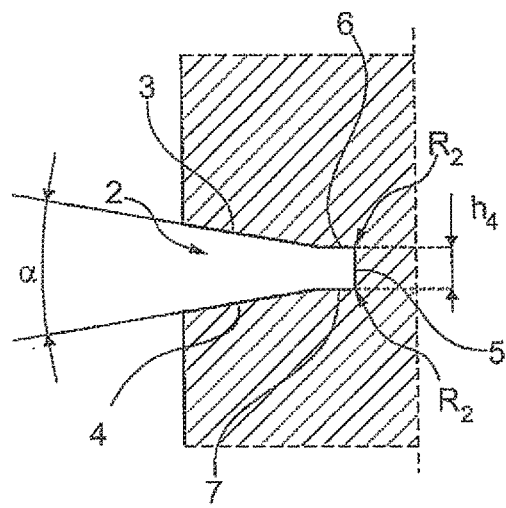
FIG. 4 shows an enlarged schematic sectional view of the trapezoid groove of FIG. 1 after the first machining step according to the method.
Figure 5:
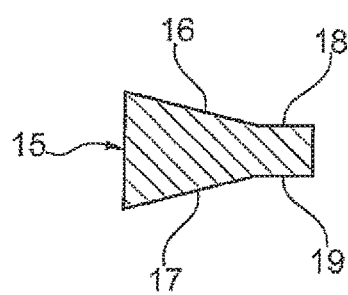
FIG. 5 shows a schematic sectional view of a tool steel for performing the machining process.

Referring to FIGS. 4 and 5, in contrast, a groove 2 is first of all plunge cut in advance according to the solution according to the present method (shown in FIG. 4). For this purpose, a special tool steel 15 (shown in FIG. 5) as regards its cross section is used. The cross section initially narrows from the outside inward with trapezoid surfaces 16, 17 and then ends in two parallel surfaces 18, 19. Using this shown cross section of the tool steel 15, the groove 2 is plunge cut in advance forming groove flanks 3,4, flanks 6,7 and groove base 5 as shown in FIG. 4, making it possible to achieve a groove base 5 with the overall height $h_4$ of at least one millimeter or even smaller. A radius $R_2$ of 0.2 millimeters is provided for the transition from the groove base 5 to the flanks 6, 7, for example. The opening angle α provided is 15 degrees and 12 minutes, for example.

Figure 6:
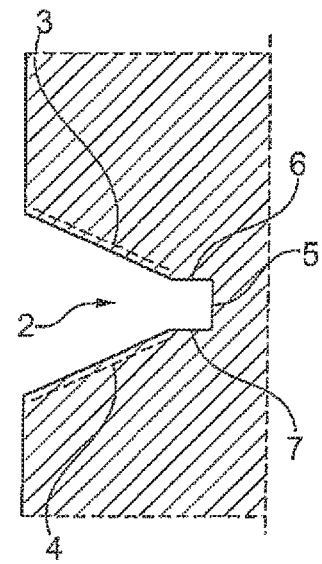
FIG. 6 shows a schematic sectional view of the trapezoid groove of FIG. 4 after the performance of the second machining step.

In a second step, which is shown in FIG. 6, the groove flanks 3, 4 are finish-machined, and it is therefore no longer necessary to machine all the material out of the piston blank by means of a second tool steel (not shown) with a correspondingly shaped cross section; instead, only superficial machining of the groove flanks 3, 4 now takes place.

What is claimed is:

1. A method for producing a piston for internal combustion engines comprising:
   machining in a first step a trapezoidal circumferential annular ring groove in a piston blank operable to receive trapezoidal-shaped rings, the first machining step further comprising:
   plunge cutting a groove base with a tool steel, the groove base having ends defining a height h4 greater than zero (0) millimeters and less than one (1) millimeter (mm);
   plunge cutting two flanks in the piston blank with the tool steel, each flank connected to a respective one of the base ends and extending radially and horizontally outward from a piston stroke axis, the two flanks oriented parallel to one another;
   plunge cutting two groove flanks in the piston blank with the tool steel, each groove flank connected to a respective one of the flanks and extending radially and angularly outward from the piston stroke axis; and
   machining in a second step the trapezoidal ring groove in the piston blank, the second machining step comprising finish machining the two groove flanks.

2. The method of claim 1 wherein the second machining step comprises finish machining of only the two groove flanks without further machining of the two flanks or the groove base.

3. A method for producing a piston for internal combustion engines comprising:
   machining in a first step a trapezoidal circumferential annular ring groove in a piston blank operable to receive trapezoidal-shaped rings, the first machining step further comprising:
   plunge cutting a groove base having ends defining a height h4 greater than zero (0) millimeters and less than one (1) millimeter (mm);
   plunge cutting a radius R2 of 0.2 millimeters (mm) at each groove base end;
   plunge cutting two flanks in the piston blank, each flank connected to a respective one of the base ends and extending radially and horizontally outward from a piston stroke axis, the two flanks oriented parallel to one another;
   plunge cutting two groove flanks at an angle alpha (α) of 15 degrees and 12 minutes relative to one another in the piston blank, each groove flank connected to a respective one of the flanks and extending radially and angularly outward from the piston stroke axis; and
   machining in a second step the trapezoidal ring groove in the piston blank, the second machining step comprising finish machining the two groove flanks.

\* \* \* \* \*